United States Patent [19]
Goldenberg et al.

[11] Patent Number: 4,913,529
[45] Date of Patent: Apr. 3, 1990

[54] ILLUMINATION SYSTEM FOR AN LCD DISPLAY SYSTEM

[75] Inventors: Jill F. Goldenberg, Pelham Manor; Joshua D. Eskin, Mt. Kisco, both of N.Y.

[73] Assignee: North American Philips Corp., New York, N.Y.

[21] Appl. No.: 290,471

[22] Filed: Dec. 27, 1988

[51] Int. Cl.4 .................... G02F 1/133; G02B 5/30; G03B 21/28; H04N 9/31
[52] U.S. Cl. ................... 350/337; 350/331 R; 350/334; 350/401; 350/402; 353/81; 358/60; 358/61
[58] Field of Search ............ 350/334, 331 R, 337, 350/169, 172, 384, 389, 400, 401, 402; 353/81, 122, 20; 358/60, 61, 231

[56] References Cited
U.S. PATENT DOCUMENTS

| 3,704,997 | 12/1972 | Smith | 350/401 |
| 3,721,756 | 3/1973 | Baker | 358/231 |
| 4,127,332 | 11/1978 | Jacobsen et al. | 353/31 |
| 4,345,258 | 8/1982 | Tsai et al. | 353/20 |
| 4,560,999 | 12/1985 | Tokuhara | 350/401 |
| 4,779,943 | 10/1988 | Tatsuno et al. | 350/169 |
| 4,786,146 | 11/1988 | Ledebuhr | 350/331 R |
| 4,796,978 | 1/1989 | Tanaka et al. | 350/337 |

FOREIGN PATENT DOCUMENTS

| 61-122626 | 6/1986 | Japan. | |
| 0295025 | 12/1987 | Japan | 350/337 |
| 0121821 | 5/1988 | Japan | 350/337 |

Primary Examiner—Stanley D. Miller
Assistant Examiner—Anita Pellman Gross
Attorney, Agent, or Firm—William L. Botjer

[57] ABSTRACT

An illumination system for an LCD projection display system to increase the brightness of the system. The system includes a polarizing beam splitter which splits a beam of light from a light source into two orthogonally polarized beams. The beam of the desired polarization direction is directed through a first face of a prism so that it reflects off of a second face of the prism and exists through a third face. The other beam of the non-desired polarization direction is passed through a device for rotating its polarization 90° and towards the underside of the second face of the prism at an angle such that it is refracted into the prism. Both beams then exit the prism through its third face, have the same polarization direction, and are only slightly divergent. The recombined beam may be thereafter directed towards the light modulation system. The illumination system minimizes the number of air-glass interfaces and the number of reflecting surfaces.

14 Claims, 3 Drawing Sheets

FIG. I

ILLUMINATION SYSTEM FOR AN LCD DISPLAY SYSTEM

BACKGROUND OF THE INVENTION

The present invention is directed to an illumination system for an LCD projection display system. The invention is specifically directed to liquid crystal projection display systems in which the liquid crystal light modulating cell is of the twisted nematic or field effect birefringement configurations, which require that the light incident at the cell be linearly polarized.

In such systems linearly polarized light is derived from a non-polarized light source and is typically filtered to yield a linearly polarized beam. This polarized beam is directed to the light modulation device. Due to this filtering, at best, only half the light output of the light source is utilized. However, projection display systems are progressing toward systems of greater and greater brightness so as to be usable in a normally lit room. Clearly, systems that permit half of the output of the light source to go unused are inefficient. The present invention is directed towards providing an LCD projection display system which utilizes all of the light from the source by separating the unpolarized light into two orthogonally polarized beams, converting the direction of polarization of one of the orthogonally polarized beams and combining it with the other so as to utilize both of the beams.

An example of an LCD display system in which only one of the orthogonal beams is utilized is shown in the design proposed by Seiko Epson Corp. which is described in the May 12, 1986 issue of "Electronics" at page 47. This system uses an absorption polarizer which absorbs the beam of the unwanted polarization and which transmits typically only 40% of the light provided by the source.

One approach for utilizing all of the light of the light source is described in U.S. Pat. No. 4,127,322 which is directed to an LCD projection television system. The system utilizes six electron beam addressed LCDS. Three LCDS are used for each beam of polarized light from a polarizing beamsplitter. The usefulness of such a system is accordingly limited by its expense and complexity.

Another approach for utilizing all of the light of the illumination system in an LCD projection television system is shown in Japanese Patent Application No. 61-122626 in which the light of the desired polarization direction is passed to the light modulating LCD. The light component of the other polarization direction is reflected by an additional mirror back towards the light source and is reflected again by the source's reflector. The returned light passes through a quarterwave plate twice so that its polarization direction is rotated 90° and thus has the same polarization of the main beam. The converted beam is thereafter passed to the light modulating LCD. However, this approach suffers from the fact that light must pass through many air-glass interfaces and reflectors which results in an inefficient system.

SUMMARY OF THE INVENTION

The present invention is directed to an illumination system for an LCD projection display system in which the light from the undesired polarization state is converted to the desired polarization state and combined therewith in an efficient manner with a minimal number of air-glass interfaces and reflecting surfaces.

The invention utilizes a prism to recombine the beams. The system includes a polarizing beam splitter which splits a beam of collimated light from a light source into two orthogonally polarized beams. The beam of the desired polarization direction is refracted into a prism at a first face of the combining prism so that it is directed towards a second face where it is reflected. The beam of the non-desired polarization direction is directed through a device for rotating its polarization 90° and towards the underside of the second face of the combining prism such that it is refracted into the prism. Both beams exit the prism through a third face with the same polarization direction and are only slightly divergent. The recombined beam is thereafter directed towards the light modulation system. The present system minimizes the number of air-glass interfaces and the number of reflecting surfaces to provide a highly efficient illumination system.

BRIEF DESCRIPTION OF THE DRAWINGS

For a better understanding of the invention reference is made to the following drawings which are to be taken in conjunction with the detailed description of the invention, in which.

DETAILED DESCRIPTION OF THE DRAWINGS

Figure 1:
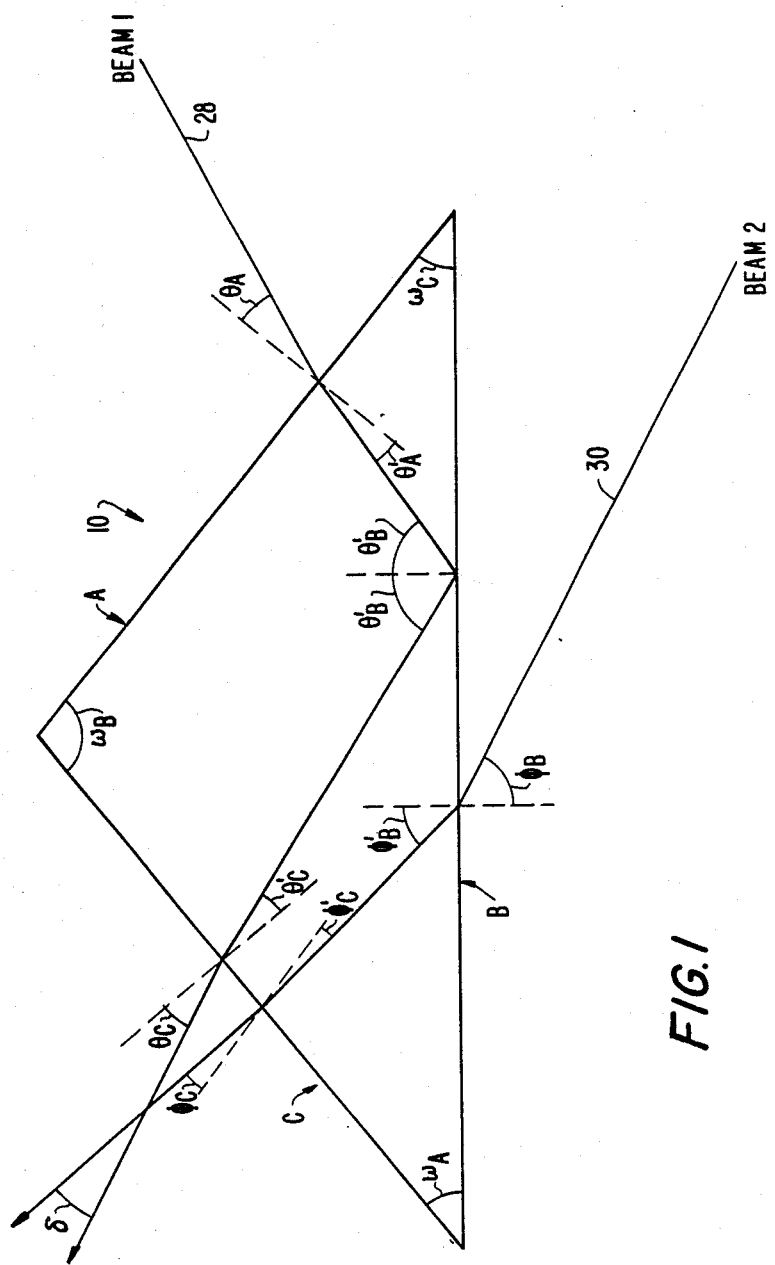
FIG. 1 illustrates the geometry of the prism used to combine a first light beam with a second light beam whose polarization has been converted to the direction of the first beam.

An ordinary prism may be used to combine two beams which originate from one source or from different sources. FIG. 1 shows an ordinary prism 10 labeled with faces A, B, and C and angles $\omega_A$, $\omega_B$, $\omega_C$. If a beam of light (beam 1) is incident at Face A with an angle $\theta_A$, it will refract into the prism with an angle $\theta'_A$ given by Snell's Law. The beam will be incident at Face B at an angle $\theta'_B$ given by $$\theta'_B = \omega_C + \theta'_A. \tag{1}$$

If $\theta'_B$ is greater or equal to the critical angle of the prism, the beam will undergo total internal reflection (TIR) at Face B. The critical angle is defined as the smallest angle with the normal at which the beam will be totally internally reflected from a surface on which it is incident. If the beam undergoes TIR, it will be incident at Face C at an angle $\theta'_C$ given by $$\theta'_C = \omega_A - \theta'_B \tag{2}$$

and will be refracted out of the prism with an angle $\theta_C$ which may be calculated using Snell's law.

If a second beam of light (beam 2) is incident at Face B at an angle $\phi_B$, it will refract into the prism with an angle $\phi'_B$ given by Snell's Law. This beam will be incident at Face C at an angle given by $$\phi'_C = \omega_A - \phi'_B \quad (3)$$

The beam will refract out of the prism with an angle $\phi_C$ that also may be calculated using Snell's Law.

Polarized beams are conventionally referred to as being "S-polarized" and "P-polarized" with the P-polarized beam defined as polarized in a direction parallel to the plane of incidence and the S beam defined as polarized perpendicular the plane of incidence. The divergence $\delta$ of the two beams after exiting the prism is given by $\phi_C$-$\theta_C$. In most applications, $\delta$ should be minimized so that the beams are nearly collinear. In order to minimize $\delta$, $\phi_B$ should be as large as possible, $\theta'_B$ should be equal to the critical angle of the prism, and $\omega_A$ should equal $(\theta'_B+\phi'_B)/2$ so that $\theta_C=\phi_C$. If the refractive index of the prism is 1.52 and if beam 2 is p-polarized, the reflection losses at face B will be relatively small for incident angles up to 73°. If $\phi_B=73°$ and $\theta'_B=41°$ (the critical angle for n=1.52) then $\delta=3.0°$. By separating the centers of beams 1 and 2 at face B, the beams can be made to coincide at Face C or at any plane parallel to Face C.

Figure 2:
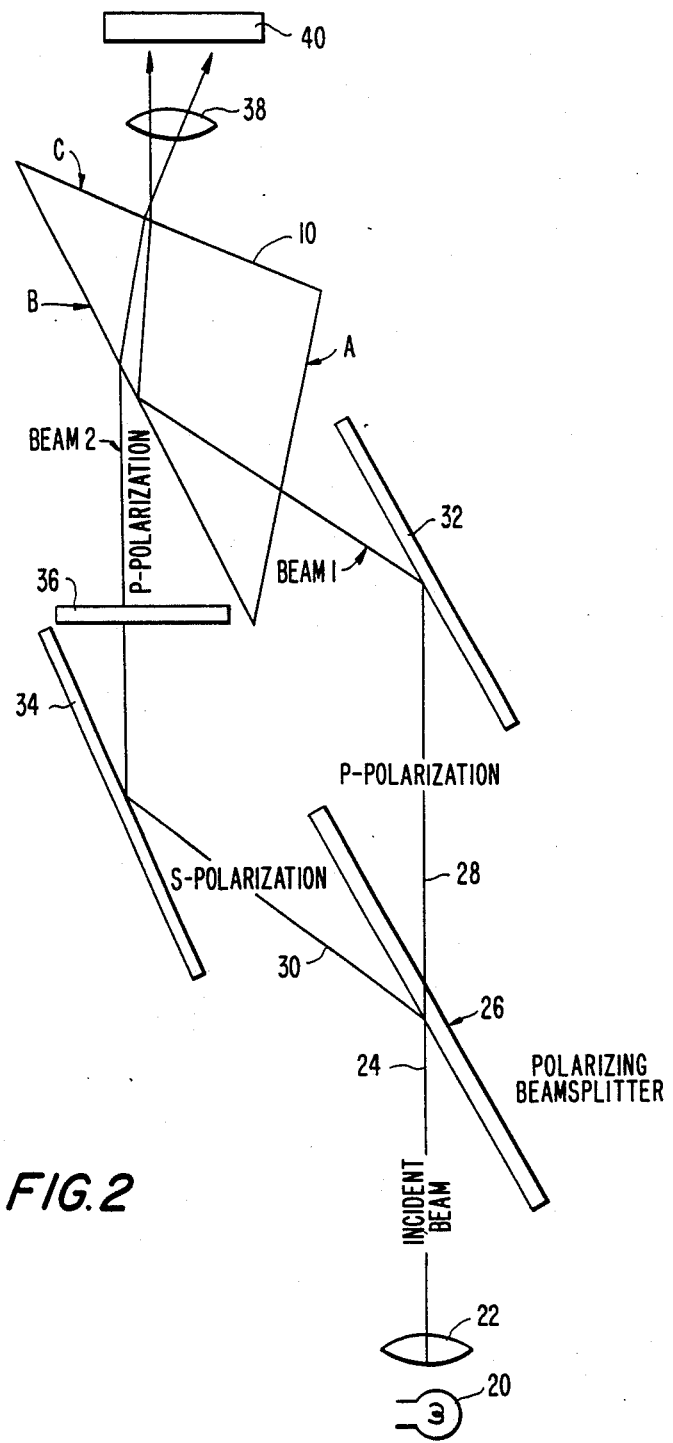
FIG. 2 illustrates the combining prism in conjunction with the polarizing beam splitter and the reflectors forming the illumination system for an LD projection television system.

FIG. 2 illustrates the use of the combining prism 10 in the inventive illumination system for an LCD television projection system. Non-polarized light derived from a light source 20 is collimated by any suitable means such as a condensor lens 22 and the non-polarized beam of light 24 is directed to a polarizing beam splitter 26. The action of polarizing beam splitter 26 is to split beam 24 into a first beam 28 of the P-polarization direction which passes through beam splitter 26 and a second beam 30 of the S-polarization direction which is reflected from beam splitter 26. First beam 28 is polarized in the P direction which is the direction to be utilized by the LCD light modulation system and is directed towards prism 10 by a reflector 32. Beam 2B enters prism 10 through face A and because it impinges on face B at greater than the critical angle of prism 10 it will undergo TIR and be reflected out of prism 10 through face C.

Second beam 30 is polarized in the S direction and is reflected off polarizing beam splitter 26 towards a reflector 34. Beam 30 is polarized in the S direction which is orthogonal to the direction required by the light modulating LCD. Accordingly, in order to convert S polarized beam 30 to the desired polarization direction (P direction) there is disposed between reflector 34 and prism 10 a polarization rotator 36 which rotates the polarization of beam 30 90° so that it becomes a P-polarized beam. Beam 30 is directed towards the underside of face B of prism 10 and it is refracted into prism 10 towards face C. Thus, it is seen that beams 2 and 30 exit face C of prism 10 and have the same direction of polarization. The beams may pass to further optics 3B for passage to a light modulating LCD 40 which modulates the light to form the desired image. Alternatively, light modulating LCD 40 may be disposed at the intersection of beams 28 and 30.

Polarizing beam splitter 26 may be any of the known devices. It may be, for example, composed of a dielectric thin film stack disposed on a suitable substrate. The stack may consist of alternating layers of high and low refractive index films each with a quarterwave optical thickness. At each film/film interface, light is incident at Brewster's angle which transmits P-polarized light and reflects S-polarized light. Similarly, reflectors 32, 34 may be any suitable reflecting device. However, the greater the efficiency of the reflecting device, such as by the use of metallized front surface mirrors, the greater the efficiency of the illumination system as a whole. Polarization rotation device 36 may be a number of devices known to rotate polarized light 90°. Such devices are for example, a halfwave achromatic waveplate, two quarterwave plates or a twisted nematic liquid crystal cell which rotates the plane of polarization of light passing therethrough. Polarization rotation device 36 may be disposed at any point along the path of the beam before the prism i.e. either before or after reflector 34. Furthermore, prism 10 may alternatively be manufactured from optical quality plastic rather than glass or a liquid filled prism. Finally, if S-polarized light is desired at the output, polarization rotation 36 device can be positioned in beam 28 rather than beam 30.

Figure 3:
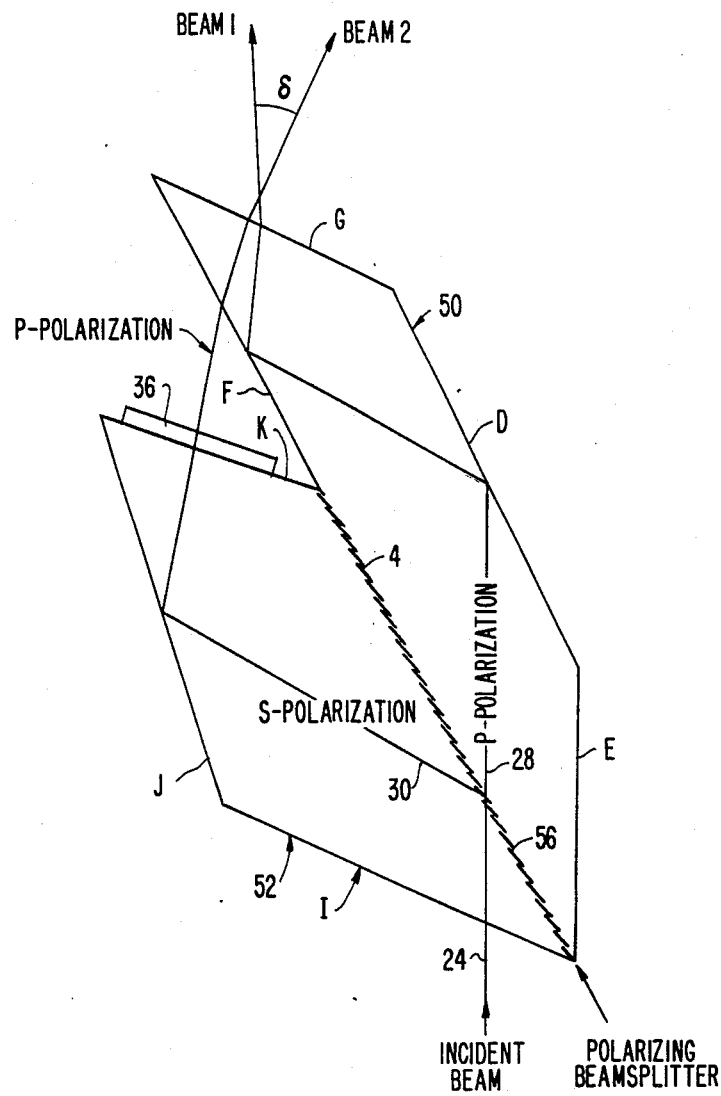
FIG. 3 illustrates a second embodiment of the illumination system in which the light splitting, reflection and combination elements are combined into two adjoining prisms to maximize the efficiency of the system.

FIG. 3 illustrates an alternative embodiment of the projection LCD television illumination system which replaces reflectors 32 and 34 with prism faces that utilize TIR to direct beams 28 and 30 and which also utilizes one of the prisms to combine the beams. The embodiment of FIG. 3 includes a prism 50 having faces D, E, F and G for directing the P-polarized beam and a prism 52 having faces H, I, J, K for directing the S-polarized beam. Disposed between face F of prism 50 and face H of prism 52 is a polarizing beam splitter 56 which may be constructed from a series of thin film quarterwave layers as described above. As can be seen from FIG. 3, prism 50 replaces both mirror 32 and combining prism 10. Prism 52 replaces mirror 34 and provides a surface (face K) for mounting polarization rotator 36.

In FIG. 3 the same reference numerals are used to depict the same elements as illustrated in FIG. 2. Incident beam of non-polarized light 2 is directed to face I of prism 52 and is split into two orthogonally disposed polarized beams 28 and 30 by beam splitter 56. Beam 28 which is polarized in the P direction undergoes TIR at face D of prism 50 and is reflected towards face F where it again undergoes TIR and emerges out of face G of prism 50. The S-polarized beam 30 reflects off polarizing beam splitter 56 toward face J of prism 52 where it undergoes TIR and is directed toward face K of prism 52 on which polarization rotator 36 is mounted. The direction of polarization of beam 30 is rotated from S-polarization to P-polarization by rotator 36 and is directed towards face F of prism 50. Beam 30 impinges on face F of prism 50 and it refracts into prism 50 and is directed towards face G where it exits at an angle of divergence $\delta$ with beam 28 as shown in FIG. 3. Thereafter the recombined beams are directed to optics 38 and LCD 40.

The embodiment of FIG. 3 provides a number of advantages over the embodiment of FIG. 2. Firstly, because mirrors 32 and 34 are replaced with prism surfaces which totally internally reflect light beams 30, 28 there is 100% efficiency in directing the light beams. In contrast, the reflectivity of a typical mirror is only 94%. Accordingly, the efficiency of the entire illumination system is improved. Secondly, a further improvement in efficiency results because an air/glass interface for each of the two light beams is eliminated. Finally, any possibility of misalignment between polarizing beam splitter 26, mirrors 32, 34 and combining prism 10 is eliminated as the surfaces are defined by the fixed geometry of prisms 50, 52. Accordingly, the configuration of FIG. 3 provides maximum brightness to the LCD illumination system.

Although the present invention has been described in conjunction with preferred embodiments, it is to be understood that modifications and variations may be resorted to without departing from the spirit and scope of the invention, as those skilled in the art would readily understand. Such modifications and variations are considered to be within the purview and scope of the invention and the appended claims.

What is claimed:

1. An optical system for splitting light into two polarized beams and for recombining same comprising:
   (a) means for obtaining from said beam of light first and second beams of light, each of said first and second beams of light being linearly polarized, the direction of polarization of each of said first and second beams of light being orthogonal to one another;
   (b) prism means, said prism means including at least first, second and third faces;
   (c) means for rotating the direction of polarization of a polarized beam of light 90°; and
   (d) first and second means for directing said first and second polarized beams of light towards said prism means, said first means directing said first beam of light through said first face of said prism means towards said second face of said prism means such that said first beam undergoes total internal reflection from said second face and is directed towards said third face of said prism means where it exits said prism means, said second means directing said second beam through said polarization rotating means towards said second face of said prism means such that said second beam is refracted into said prism means and is directed toward said third face where it exits said prism means.

2. The system as claimed in claim 1 wherein said first and second directing means comprise faces of prisms.

3. The optical system as claimed in claim 1, wherein said first and second directing means comprise mirrors.

4. The system as claimed in claim 1 wherein said first directing means and said prism means comprise a single prism.

5. The system as claimed in claim 1 wherein said second directing means comprises a prism having at least first and second faces, and said first face of said prism functioning as said second directing means.

6. The system as claimed in claim 5 wherein said second face of said prism mounts said polarization rotating means.

7. The system as claimed in claim 1 wherein said means for obtaining said first and second beams comprises a polarizing beam splitter.

8. The system as claimed in claim 1 wherein said means for rotating said polarization comprise a half-wave plate.

9. The system as claimed in claim 1 wherein said means for rotating said polarization of said second beam comprise a twisted nematic liquid crystal cell.

10. The system as claimed in claim 1, wherein said first and second directing means comprises first and second prism means and said means for obtaining said first and second beams are disposed between said first and second prism means.

11. An illumination system for an LCD projection display system comprising:
    (a) a light source;
    (b) means for collecting the light of said light source into a beam;
    (c) means for obtaining from said beam of light first and second beams of light, each of said first and second beams of light being linearly polarized, the direction of polarization of each of said first and second beams of light being orthogonal to one another;
    (d) prism means, said prism means including at least, first, second and third faces;
    (e) means for rotating the direction of polarization of a polarized beam of light 90°;
    (f) first and second means for directing said first and second polarized beams of light towards said prism means, said first means directing said first beam of light through said first face of said prism means towards said second face of said prism means such that said first beam undergoes total internal reflection from said face and is directed towards said third face of said prism means where it exits said prism means, said second means directing said second beam through said polarization rotating means towards said second face of said prism means such that said second beam is refracted into said prism and is directed toward said third face where it exits said prism means; and
    (g) LCD light modulating means for modulating said beams of light after exiting said prism means.

12. The system as claimed in claim 11 wherein said first and second directing means comprise faces of prisms.

13. The system as claimed in claim 11, wherein said first and second directing means comprise mirrors.

14. The system as claimed in claim 11, wherein said first directing means and said prism means comprise a first prism, said second directing means comprise a second prism, said polarized light obtaining means are disposed between said first and second prism and said rotating means are disposed on a face of said second prism.

* * * * *